United States Patent
Kawahara

(10) Patent No.: US 10,281,018 B2
(45) Date of Patent: May 7, 2019

(54) LOCK-UP DEVICE FOR TORQUE CONVERTER

(71) Applicant: EXEDY Corporation, Neyagawa-shi, Osaka (JP)

(72) Inventor: Yuki Kawahara, Neyagawa (JP)

(73) Assignee: EXEDY CORPORATION, Neyagawa-Shi, Osaka (JP)

(*) Notice: Subject to any disclaimer, the term of this patent is extended or adjusted under 35 U.S.C. 154(b) by 687 days.

(21) Appl. No.: 14/889,387

(22) PCT Filed: Mar. 20, 2014

(86) PCT No.: PCT/JP2014/057722
§ 371 (c)(1),
(2) Date: Nov. 5, 2015

(87) PCT Pub. No.: WO2014/185148
PCT Pub. Date: Nov. 20, 2014

(65) Prior Publication Data
US 2016/0102744 A1    Apr. 14, 2016

(30) Foreign Application Priority Data
May 16, 2013  (JP) ................................. 2013-103682

(51) Int. Cl.
*F16H 45/02* (2006.01)
*F16F 15/123* (2006.01)
*F16D 3/64* (2006.01)

(52) U.S. Cl.
CPC ............... *F16H 45/02* (2013.01); *F16D 3/64* (2013.01); *F16F 15/12366* (2013.01);
(Continued)

(58) Field of Classification Search
CPC .... F16H 45/02; F16H 2045/0221–0231; F16F 15/12366; F16F 15/12373
See application file for complete search history.

(56) References Cited

U.S. PATENT DOCUMENTS

| 5,915,511 A * | 6/1999 | Yamaguchi ............. F16H 45/02 192/213.1 |
| 2004/0185940 A1 * | 9/2004 | Yamamoto ........ F16F 15/12366 464/68.4 |

(Continued)

FOREIGN PATENT DOCUMENTS

| CN | 102597567 A | 7/2012 |
| DE | 102004010884 A1 | 10/2004 |

(Continued)

OTHER PUBLICATIONS

International Search Report for Int'l App. No. PCT/JP2014/057722, dated Jun. 24, 2014, 1-2.

*Primary Examiner* — Huan Le
(74) *Attorney, Agent, or Firm* — United IP Counselors, LLC

(57) ABSTRACT

A lock-up device for a torque converter for transmitting a torque and for absorbing and attenuating a torsional vibration includes an input rotary member, an output rotary member disposed on both axial sides of the input rotary member and rotatable relatively to the input rotary member, and a plurality of first coil springs disposed in radially inner positions. The first coil springs are compressed in series by rotation of the input rotary member relative to the output rotary member whereby the torque is inputted therein from the input rotary member. The lock-up device also includes at least one second coil spring compressed when the input rotary member and the output rotary member are rotated relatively to each other at a predetermined relative angle or greater. The lock-up device additionally includes a float member disposed radially inward of the first coil springs and coupling the plural first coil springs in series.

8 Claims, 11 Drawing Sheets

(52) U.S. Cl.
CPC ............... *F16F 15/12373* (2013.01); *F16H 2045/0205* (2013.01); *F16H 2045/0226* (2013.01); *F16H 2045/0231* (2013.01); *F16H 2045/0278* (2013.01)

(56) References Cited

U.S. PATENT DOCUMENTS

2012/0217113 A1   8/2012  Kawahara et al.
2012/0252586 A1  10/2012  Takikawa et al.

FOREIGN PATENT DOCUMENTS

| | | |
|---|---|---|
| JP | 2004278744 A | 10/2004 |
| JP | 2010216499 A | 9/2010 |
| JP | 2011075028 A | 4/2011 |
| JP | 2011127686 A | 6/2011 |
| JP | 2011252584 A | 12/2011 |
| JP | 2012184840 A | 9/2012 |
| JP | 2012202544 A | 10/2012 |
| WO | WO2011055622 A1 | 5/2011 |

\* cited by examiner

LOCK-UP DEVICE FOR TORQUE CONVERTER

CROSS-REFERENCES TO RELATED APPLICATIONS

This application is the U.S. National Phase of PCT International Application No. PCT/JP2014/057722, filed on Mar. 20, 2014. That application claims priority to Japanese Patent Application No. 2013-103682, filed May 16, 2013. The contents of both applications are herein incorporated by reference in their entirety.

BACKGROUND

Technical Field

The present invention relates to a lock-up device for a torque converter, particularly to a lock-up device for a torque converter for transmitting a torque and absorbing and attenuating a torsional vibration.

Background Information

Torque converters are often equipped with a lock-up device for directly transmitting a torque from a front cover to a turbine. This type of lock-up device includes a piston, a drive plate, a plurality of coil springs, a driven plate and a spring holder (see Japan Laid-open Patent Application Publication No. 2011-252584).

In this type of lock-up device, a plurality of coil springs are disposed on the outer peripheral side, and likewise, a plurality of coil springs are disposed on the inner peripheral side. Additionally, small coil springs are respectively disposed in the inner peripheral parts of the plural coil springs disposed on the inner peripheral side, and each has a free length shorter than that of each coil spring disposed on the inner peripheral side. With the construction, multistage torsional characteristics are formed.

SUMMARY

In the well-known lock-up device, when the drive plate and the driven plate are rotated relatively to each other and thereby a torsion angle is produced therebetween, the outer peripheral side coil springs are configured to be actuated first. Next, when the torsion angle further increases, the inner peripheral side coil springs are configured to be actuated. Subsequently, when the torsion angle further increases, the small coil springs disposed in the inner peripheral parts of the inner peripheral side coil springs are configured to be actuated. Thus, the multistage torsional characteristics are formed.

In the well-known lock-up device, a first stage torsional characteristic is formed by actuation of the outer peripheral side coil springs. At this time, the outer peripheral side coil springs slide against the spring holder (a float member) disposed on the outer peripheral side of the outer peripheral side coil springs by a centrifugal force. Accordingly, a hysteresis torque is generated. However, when the hysteresis torque increases in the first stage torsional characteristic (torsional stiffness), the coil springs cannot be efficiently actuated, and hence, this may result in degradation in efficiency of fuel consumption.

On the other hand, to enhance efficiency of fuel consumption, it is desirable to set the magnitude of the first stage torsional characteristic (torsional stiffness) to be low. However, when the first stage torsional stiffness is set to be low, it is required to increase the magnitude of torsional stiffness in the second and subsequent stages with increase in magnitude of a target torque. Hence, there is a possibility that a vibration is generated due to difference in magnitude of torsional stiffness between before and after a bent point at which the torsional stiffness is changed. To alleviate the vibration, it is desirable to reduce difference in magnitude of torsional stiffness between before and after the bent point. Therefore, the lock-up device is designed to have the multistage torsional characteristics.

The present invention has been produced in view of the drawback as described above, and it is an object of the present invention to set multistage torsional characteristics for a lock-up device, and simultaneously, to reduce a hysteresis torque of the lock-up device.

Solution to Problems

A lock-up device for a torque converter according to a first aspect is a device for transmitting a torque and for absorbing and attenuating a torsional vibration. The present lock-up device includes an input rotary member, an output rotary member, a plurality of first coil springs, at least one second coil spring and a float member. The output rotary member is disposed on both axial sides of the input rotary member and is rotatable relatively to the input rotary member. The plural first coil springs are disposed in radially inner positions. The plural first coil springs are configured to be compressed in series by rotation of the input rotary member relative to the output rotary member whereby the torque is configured to be inputted therein from the input rotary member. The at least one second coil spring is configured to be compressed when the input rotary member and the output rotary member are rotated relatively to each other at a predetermined relative angle or greater. The float member is disposed radially inward of the first coil springs and couples the plural first coil springs in series.

In the present lock-up device, when the input rotary member and the output rotary member are rotated relatively to each other and thereby a torsion angle is produced between the input rotary member and the output rotary member, the plural first coil springs disposed in radially inner positions are configured to be compressed. Under the condition, the float member is disposed radially inward of the plural first coil springs and couples the plural first coil springs. Accordingly, the plural first coil springs are configured to be compressed in series. Next, when the torsion angle becomes the predetermined angle or greater, the at least one second coil spring is configured to be compressed. At this time, both of the first coil springs and the at least one second coil spring are being compressed. Thus, multistage torsional characteristics can be set in the present lock-up device.

In the present lock-up device, the plural first coil springs, disposed in radially inner positions, are compressed between the input rotary member and the output rotary member. Additionally, the float member couples the plural first coil springs from the radially inner side of the first coil springs. With the construction, a centrifugal force acting on the first coil springs becomes small, and a slide resistance of the first coil springs against the float member, which is caused by the centrifugal force, can be remarkably reduced. Put differently, a hysteresis torque can be remarkably reduced. Accordingly, the first coil springs can be efficiently actuated.

Moreover, in the present lock-up device, adjacent first coil springs are coupled in series through the float member. With the construction, the magnitude of a first stage torsional characteristic (torsional stiffness) can be set to be low. Furthermore, even if the first stage torsional characteristic (torsional stiffness) is thus set to be low, the at least one second coil spring is configured to be compressed when the torsion angle becomes the predetermined angle or greater. Hence, the lock-up device can be reliably actuated until a target torque is obtained.

Thus in the present lock-up device, multistage torsional characteristics can be set, and also, the hysteresis torque can be reduced.

A lock-up device for a torque converter according to a second aspect relates to the lock-up device of the first aspect, and wherein a torsional stiffness in torsional characteristics is configured to be changed by compressing at least any one of the plural first coil springs such that coiled parts thereof are closely contacted to each other. The at least one second coil spring is configured to be compressed when the input rotary member and the output rotary member are rotated relatively to each other at the predetermined relative angle or greater whereby the torsional stiffness is configured to be further changed.

In the present lock-up device, the torsional stiffness is configured to be changed by compressing at least any one of the plural first coil springs such that the coiled parts thereof are closely contacted to each other in the condition that the plural first coil springs are being actuated. Additionally, when the torsion angle becomes the predetermined angle (relative angle) or greater, the at least one second coil spring is configured to be compressed, whereby the torsional stiffness is configured to be further changed. Thus, multistage torsional characteristics can be easily set in the present lock-up device.

A lock-up device for a torque converter according to a third aspect relates to the lock-up device of the first aspect, and further includes at least one third coil spring, each of which is disposed in an inner peripheral part of one of the first coil springs.

In the present lock-up device, each third coil spring is disposed in the inner peripheral part of one of the first coil springs. Hence, the torsional stiffness can be easily regulated by the third coil spring/springs. It should be noted that when the free length of each first coil spring and that of each third coil spring are equal, it is possible to achieve increase in torque to be transmitted, reduction in stiffness due to increase in torsion angle, and/or so forth by setting the torsional stiffness with the first coil springs and the third coil spring/springs in comparison with setting the torsional stiffness only with the first coil springs. Thus, damper performance can be enhanced.

A lock-up device for a torque converter according to a fourth aspect relates to the lock-up device of the third aspect, and wherein the plural third coil springs respectively have a free length shorter than a free length of the first coil springs. A torsional stiffness in torsional characteristics is configured to be changed when at least any one of the plural first coil springs and the third coil spring disposed in the inner peripheral part of the at least any one of the plural first coil springs are simultaneously compressed. The at least one second coil spring is configured to be compressed when the input rotary member and the output rotary member are rotated relatively to each other at the predetermined relative angle or greater whereby the torsional stiffness is configured to be further changed.

In the present lock-up device, the torsional stiffness is configured to be changed when the third coil spring disposed in the inner peripheral part of at least any one of the plural first coil springs is further actuated in the condition that only the plural first coil springs are being actuated. Moreover, when the torsion angle becomes the predetermined angle or greater, the at least one second coil spring is configured to be compressed, whereby the torsional stiffness is configured to be further changed. Thus, multistage torsional characteristics can be easily set in the present lock-up device. Additionally, in this case, the number of stages in the torsional characteristics can be increased. Hence, the lock-up device is enabled to smoothly perform an action when the torsional stiffness varies at a bent point in the torsional characteristics.

A lock-up device for a torque converter according to a fifth aspect relates to the lock-up device of the third aspect, and wherein a torsional stiffness in the torsional characteristics is configured to be changed when the first coil springs and the third coil springs are simultaneously compressed. Additionally, the torsional stiffness is configured to be further changed when at least any one of the plural third coil springs is compressed such that coiled parts thereof are closely contacted to each other. Moreover, the at least one second coil spring is configured to be compressed when the input rotary member and the output rotary member are rotated relatively to each other at the predetermined relative angle or greater whereby the torsional stiffness is configured to be further changed.

In the present lock-up device, the torsional stiffness is configured to be changed by compressing at least any one of the plural third coil springs such that the coiled parts thereof are closely contacted to each other in a condition that the plural first coil springs and the third coil springs are being actuated. Moreover, when the torsion angle becomes the predetermined angle or greater, the at least one second coil spring is configured to be compressed, whereby the torsional stiffness is configured to be further changed.

Thus, multistage torsional characteristics can be easily set in the present lock-up device by compressing at least any one of the plural third coil springs such that the coiled parts thereof are closely contacted to each other. Additionally, in this case, the number of stages in the torsional characteristics can be increased. Hence, the lock-up device is enabled to smoothly perform an action when the torsional stiffness varies at a bent point in the torsional characteristics.

A lock-up device for a torque converter according to a sixth aspect relates to the lock-up device of the first aspect, and wherein the at least one second coil spring is disposed radially outward of the first coil springs.

In the present lock-up device, the at least one second coil spring is disposed radially outward of the first coil springs. The at least one second coil spring is configured to be compressed when the torsion angle becomes the predetermined angle or greater, and hence, does not contribute to a hysteresis torque in the first stage torsional characteristic (torsional stiffness). Put differently, multistage torsional characteristics can be set while a condition is maintained in which the hysteresis torque in the first stage torsional characteristic is reduced.

A lock-up device for a torque converter according to a seventh aspect relates to the lock-up device of the sixth aspect, and further includes at least one fourth coil spring disposed circumferentially away from the first coil springs at intervals. In the construction, the at least one fourth coil spring is configured to be compressed after the plural first coil springs and the plural second coil springs are compressed whereby the torsional stiffness is configured to be further changed.

In the present lock-up device, the at least one fourth coil spring is further configured to be compressed after the plural first coil springs and the plural second coil springs are compressed. Hence, the number of stages in the torsional characteristics can be increased. Put differently, the lock-up device is enabled to smoothly perform an action when the torsional stiffness varies at a bent point in the torsional characteristics.

A lock-up device for a torque converter according to an eighth aspect relates to the lock-up device of the first aspect, and further includes at least one fifth coil spring, each of which is disposed in an inner peripheral part of each of the at least one second coil spring.

In the present lock-up device, the at least one fifth coil spring is disposed in the inner peripheral part of the at least one second coil spring. Hence, the torsional stiffness can be easily regulated by the at least one fifth coil spring. When the free length of each fifth coil spring is herein set to be shorter than that of each second coil spring, multistage torsional characteristics can be easily set. Additionally, in this case, the number of stages in the torsional characteristics can be increased. Hence, the lock-up device is enabled to smoothly perform an action when the torsional stiffness varies at a bent point in the torsional characteristics.

A lock-up device for a torque converter according to a ninth aspect relates to the lock-up device of the first aspect, and wherein the float member has a body, coupling parts and holding parts. The body is disposed radially inward of the first coil springs. The coupling parts have a shape outwardly protruding from the body and each is disposed between adjacent two of the first coil springs. The holding parts are disposed radially outward of the coupling parts and each holds outer peripheral parts of adjacent two of the first coil springs.

In the present lock-up device, the holding parts of the float member, formed radially outward of the coupling parts, hold the outer peripheral parts of adjacent two of the first coil springs. Hence, the first coil springs can be restricted from moving radially outward even when the centrifugal force acts on the first coil springs. In short, a hysteresis torque attributed to the first coil springs can be reliably reduced.

In the present invention, it is possible to implement a lock-up device for which multistage torsional characteristics can be set, and simultaneously, in which a hysteresis torque can be reduced.

DETAILED DESCRIPTION OF EMBODIMENTS

First Exemplary Embodiment

[Construction of Torque Converter]

Figure 1:
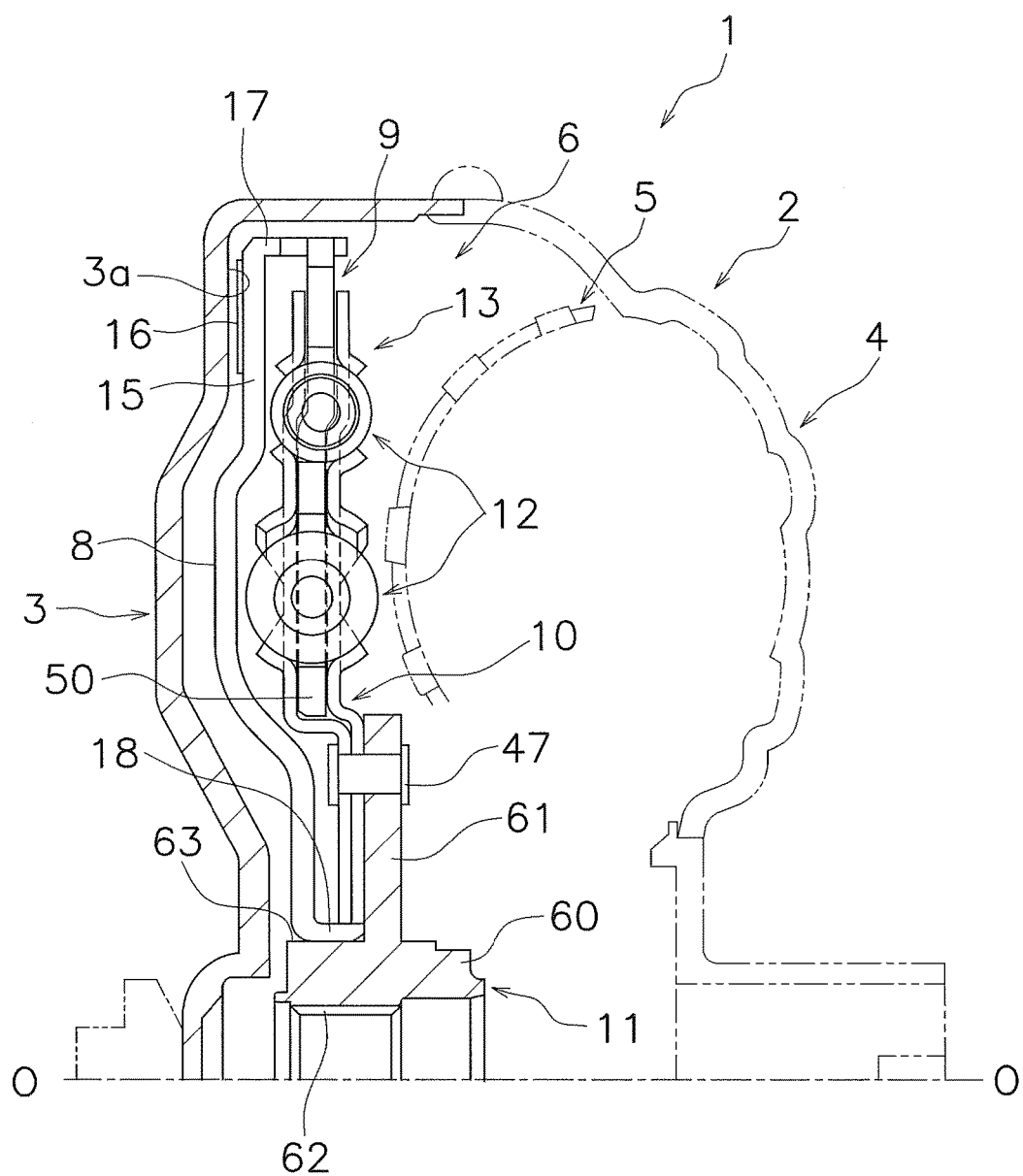
FIG. 1 is a schematic vertical cross-sectional view of a torque converter employed for a first exemplary embodiment of the present invention.

FIG. 1 shows a schematic vertical cross-sectional view of a torque converter 1 as an exemplary embodiment of the present invention. In FIG. 1, an engine (not shown in the drawing) is disposed on the left side, whereas a transmission (not shown in the drawing) is disposed on the right side. Additionally, O-O depicted in FIG. 1 indicates a rotational axis of the torque converter 1, arrow R1 depicted in FIG. 2 indicates an engine rotational direction, and arrow R2 indicates a rotational direction opposite to the engine rotational direction.

The torque converter 1 includes a torque converter body 2 and a lock-up device 6. In FIG. 1, the torque converter body 2 is mainly composed of a front cover 3, an impeller 4, a turbine 5 and so forth. The construction of the torque converter body 2 is similar to that of a well-known torque converter body, and therefore will be briefly explained.

The front cover 3 is a disc-shaped member coupled to a crankshaft of the engine. The front cover 3 composes an operating oil chamber of the torque converter 1 together with the impeller 4. The turbine 5 is disposed within the operating oil chamber so as to be disposed axially in opposition to the impeller 4. The inner peripheral part of the turbine 5 is coupled to a turbine hub 11 to be described. The turbine hub 11 is coupled to a main driveshaft (not shown in the drawing) of the transmission.

The turbine hub 11 is a cylindrical member. The turbine hub 11 is composed of a boss 60 and a disc-shaped flange 61 formed on the outer peripheral surface of the boss 60. The boss 60 has a spline 62 formed on the inner peripheral surface thereof. The spline 62 is spline-coupled to the transmission side main driveshaft. Moreover, an outer peripheral surface 63 is formed on the boss 60. The outer peripheral surface 63 is located on the axially engine side of the flange 61.

[Construction of Lock-Up Device]

Figure 2:
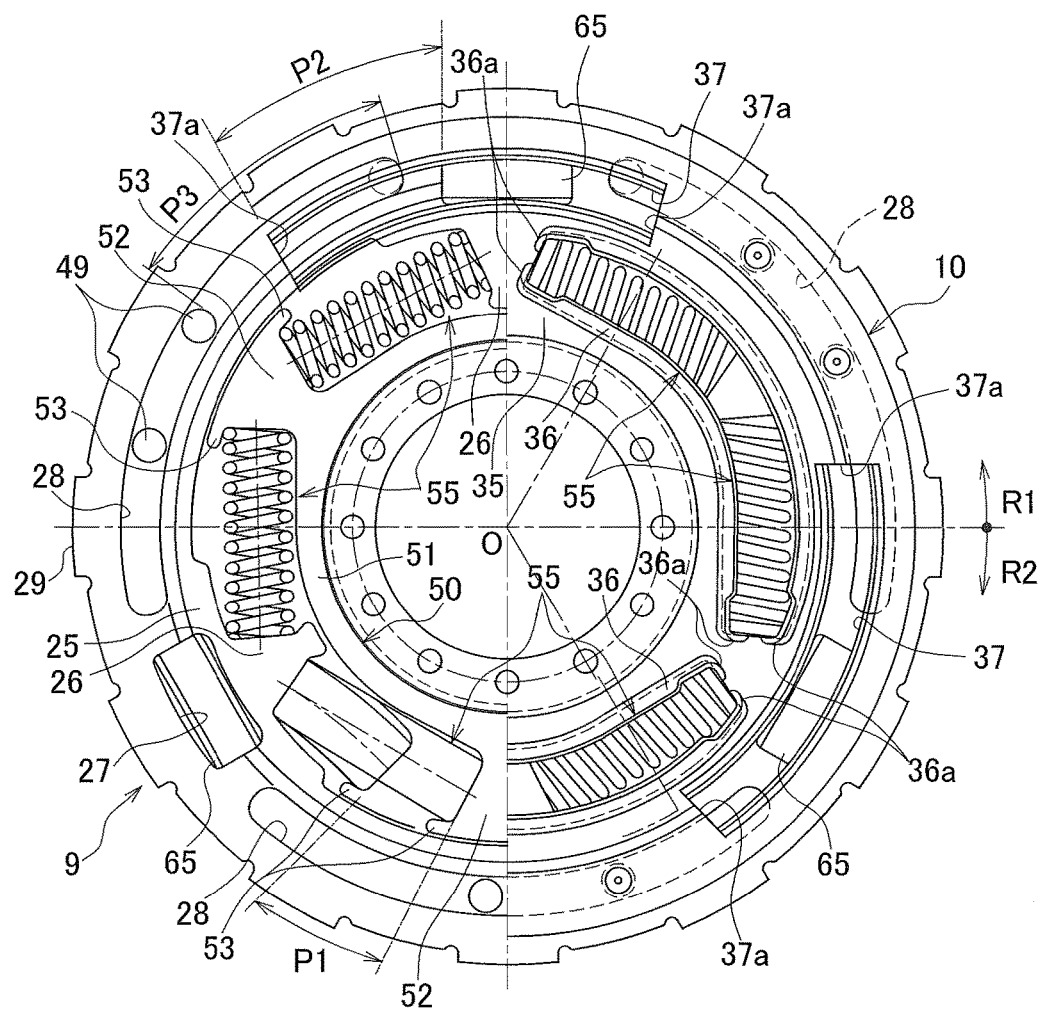
FIG. 2 is a lateral face view of a lock-up device of the torque converter employed for the first exemplary embodiment.
Figure 3:
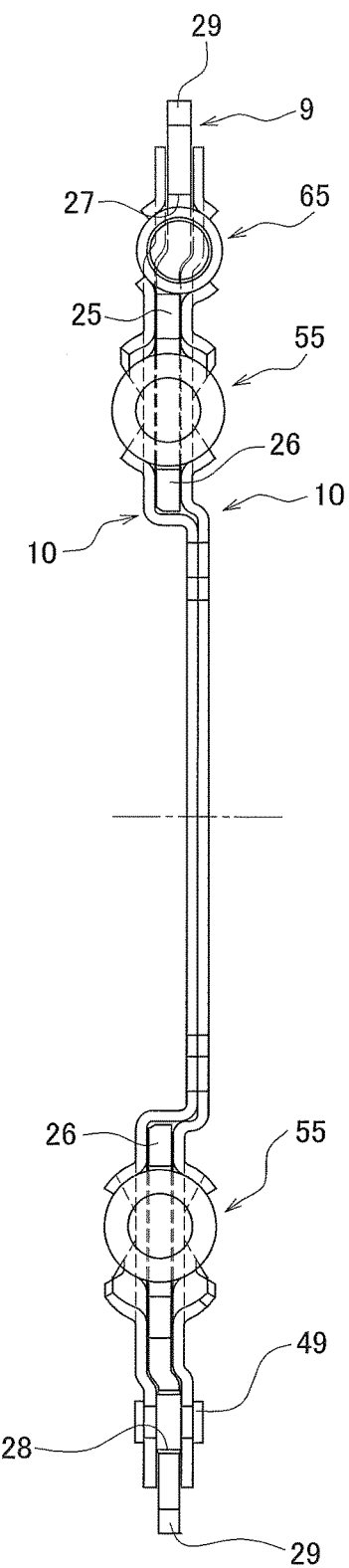
FIG. 3 is a vertical cross-sectional view of a damper of the lock-up device employed for the first exemplary embodiment.

Using FIGS. 1 to 3, the lock-up device 6 will be herein explained. The lock-up device 6 is a device for mechanically transmitting a torque from the front cover 3 to the turbine 5, and simultaneously, for absorbing and attenuating a torsional vibration inputted therein. Put differently, the lock-up device 6 has a clutch function and a damper function. As shown in FIG. 1, the lock-up device 6 is disposed in a space between the front cover 3 and the turbine 5.

The lock-up device 6 is mainly composed of a piston 8, a drive plate 9, driven plates 10, a plurality of torsion springs 12 and a float member 50. These members entirely compose a damper mechanism 13. In the damper mechanism 13, the drive plate 9 functions as an input rotary member, the driven plates 10 function as an output rotary member, and the torsion springs 12 function as elastic members between the both members. It should be noted that the piston 8 and the drive plate 9 may be regarded as functioning as the input rotary member.

The piston 8 is disposed so as to axially divide the space between the front cover 3 and the turbine 5. The piston 8 is an annular disc-shaped member, and is also a member axially movable by variation in hydraulic pressure within the torque converter 1. The piston 8 is disposed on the axially transmission side of and adjacently to the front cover 3. The piston 8 has an annular friction coupling part 15.

The friction coupling part 15 is formed in the outer peripheral part of the piston 8. The friction coupling part 15 has an annular flat shape. The friction coupling part 15 is opposed to an annular flat friction surface 3a of the front cover 3. Additionally, an annular friction facing 16 is mounted to the front cover 3 side surface of the friction coupling part 15. The turbine 5 side surface of the friction coupling part 15 is processed by thermal treatment such as gas soft nitriding.

The torsion springs 12 are configured to be compressed by relative rotation between the drive plate 9 and the driven plates 10. The torsion springs 12 are held by at least either of the drive plate 9 and the driven plates 10. The term "torsion springs 12" is a term that encompasses first coil springs 55 and second coil springs 65. It should be noted that in the example herein described, the torsion springs 12 do not include spring sheets. However, the torsion springs 12 may include the spring sheets.

An outer peripheral side tubular part 17 is formed in the outer peripheral part of the piston 8 and axially extends toward the transmission. On the other hand, an inner peripheral side tubular part 18 is formed on the inner peripheral edge of the piston 8 and axially extends toward the transmission. The inner peripheral side tubular part 18 is radially supported by the outer peripheral surface 63 of the boss 60. Accordingly, the piston 8 is configured to be axially and rotation-directionally movable with respect to the turbine hub 11.

The drive plate 9 is fixed to the piston 8, and functions as an input member for inputting a torque into the torsion springs 12. The drive plate 9 is an annular plate member, and is coupled at the outer peripheral part thereof to the outer peripheral part (the outer peripheral side tubular part 17) of the piston 8. The drive plate 9 is disposed axially between the turbine 5 and the piston 8. The drive plate 9 is disposed axially between two driven plates 10. The drive plate 9 is rotatable relatively to the two driven plates 10.

The drive plate 9 has a body 25, first spring pressing parts 26, first spring holding parts 27, attachment parts 28 and a coupling part 29. The body 25 has a substantially annular shape.

The first spring pressing parts 26 have a shape radially inwardly protruding from the body 25. The plural (e.g., three) first spring pressing parts 26 are respectively circumferentially disposed at predetermined intervals. Plural ones (e.g., two) of the first coil springs 55 are disposed between any adjacent two of the first spring pressing parts 26.

The first spring holding parts 27 are formed in the body 25 and located radially outward of the first spring pressing parts 26. The plural (e.g., three) first spring holding parts 27 are respectively circumferentially disposed at predetermined intervals. The first spring holding parts 27 are rectangular holes in which the second coil springs 65 are respectively disposed.

The attachment parts 28 serve to attach the drive plate 9 to the driven plates 10 so as to make the drive plate 9 rotatable relatively to the driven plates 10. The attachment parts 28 are elongated holes extending in the circumferential direction. Shafts of fixation members 49, for instance, shafts of rivets are respectively inserted through the elongated holes. The construction enables the drive plate 9 to rotate relatively to the two driven plates 10 through the fixation members 49, for instance, the rivets. Additionally, the attachment parts 28 compose a stopper mechanism together with the fixation members (e.g., the rivets). The maximum torque in the torsional characteristics is determined when one fixation member 49 is contacted to one of the both circumferential ends in each attachment part 28 (each elongated hole).

The coupling part 29 is a part for coupling the drive plate 9 to the piston 8. The coupling part 29 is formed in the outer peripheral part of the body 25. The coupling part 29 is attached to the outer peripheral side tubular part 17 of the piston 8, and is rotatable with the piston 8.

The driven plates 10 are members that hold the torsion springs 12 and to which a torque from the torsion springs 12 is outputted. The driven plates 10 are annular and disc-shaped members. The driven plates 10 are disposed axially between the turbine 5 and the piston 8. The drive plate 9 is disposed axially between the two driven plates 10. In other words, the driven plates 10 are disposed on the both sides of the drive plate 9. The inner peripheral parts of the driven plates are fixed to the flange 61 by a plurality of rivets 47 circumferentially aligned.

Each driven plate 10 has a body 35, second spring holding parts 36 and second spring pressing parts 37. The body 35 has a substantially annular shape.

The second spring holding parts 36 are formed in radially inner part of the body 35. The second spring holding parts 36 are window parts extending in the circumferential direction. Each second spring holding part 36 holds the radially outer parts and the radially inner parts of the first coil springs 55. The plural (three) second spring holding parts 36 are herein formed in the body 35. Additionally, each second spring holding part 36 has contact parts 36a on the both circumferential ends thereof, and the contact parts 36a are contacted to one ends of the first coil springs 55.

The second spring pressing parts 37 are formed in a radially outer part of the body 35. The second spring pressing parts 37 are window parts extending in the circumferential direction. The plural (three) second spring pressing parts 37 are herein formed in the body 35. Each second spring pressing part 37 holds the radially outer part and the radially inner part of each second coil spring 65. Additionally, each second coil spring 65 is circumferentially movable in each second spring pressing part 37 (window part) together with the drive plate 9. Moreover, the circumferential ends of each second spring pressing part 37 are respectively contactable to the ends of each second coil spring 65. Specifically, each second spring pressing part 37 has contact parts 37a on the both circumferential ends thereof, and the contact parts 37a are contactable to the ends of each second coil spring 65. When the drive plate 9 is rotated relatively to the driven plates 10 and thus one abutting part 37a of each second spring pressing part 37 is contacted to one end of each second coil spring 65, each second coil spring 65 is configured to be compressed.

The float member 50 is a member for causing adjacent two of the first coil springs 55 to actuate in series. The float member 50 has a body 51, coupling parts 52 and holding parts 53. The body 51 has a substantially annular shape, and is disposed radially inward of the first coil springs 55. The coupling parts 52 have a shape outwardly protruding from the body 51. Each coupling part 52 is disposed between adjacent two of the first coil springs 55 and is contacted to one ends of the adjacent two first coil springs 55. Each holding part 53 is formed radially outward of each coupling part 52, and holds the outer peripheral parts of the one ends of the adjacent two first coil springs 55.

<Detailed Construction of Torsion Springs>

As shown in FIGS. 2 and 3, the torsion springs 12 include plural (e.g., six) first coil springs 55 and plural (e.g., three) second coil springs 65.

The first coil springs 55 are disposed between the drive plate 9 and the driven plates 10, and function as elastic members. The first coil springs 55 are disposed in radially inner positions. When described in detail, a plurality of pairs of the first coil springs 55 are disposed in radially inner positions so as to be aligned in the circumferential direction. Additionally, the plural pairs of the first coil springs 55, for instance, three pairs of the first coil springs 55 are circumferentially disposed at equal intervals. Each pair of the first coil springs 55 is disposed between two first spring pressing parts 26 disposed adjacently to each other in the circumferential direction.

Each pair of the first coil springs 55 is composed of a plurality of (e.g., two) first coil springs 55. Each coupling part 52 of the float member 50 is disposed between two first coil springs 55. Additionally, two first coil springs 55 are disposed between two first spring pressing parts 26 disposed adjacently to each other in the drive plate 9. Moreover, either of two first coil springs 55 is compressible such that the coiled parts thereof are closely contacted to each other. When described in detail, either of two first coil springs 55 is designed such that the coiled parts thereof are wound more narrowly than those of the other of the two first coil springs 55.

When described in detail, one ends of the first coil springs 55 are contacted to the coupling parts 52 of the float member 50, whereas the other ends of the first coil springs 55 are contacted to the first spring pressing parts 26 of the drive plate 9 and the second spring holding parts 36 (the circumferential ends thereof) of the driven plates 10. Under the condition, when the drive plate 9 and the driven plates 10 are rotated relatively to each other and thereby a torsion angle is produced, the plural pairs of the first coil springs 55 (three pairs of two first coil springs 55 disposed in series) are respectively compressed in series in the rotational direction.

The second coil springs 65 are disposed between the drive plate 9 and the driven plates 10, and function as elastic members. The second coil springs 65 are disposed in radially outer positions. When described in detail, the plural second coil springs 65 are respectively disposed radially outward of the plural pairs of the first coil springs 55 so as to be aligned in the circumferential direction. Additionally, the plural (e.g., three) second coil springs 65 are circumferentially disposed at equal intervals.

More specifically, the three second coil springs 65 are respectively disposed in the first spring holding parts 27 of the drive plate 9. Yet more specifically, the both circumferential ends of each first spring holding part 27 are contacted to the both sides of each second coil spring 65. Additionally, the three second coil springs 65 are respectively circumferentially movable in the second spring pressing parts 37 (window parts) of the driven plates 10. Moreover, the second coil springs 65 are configured to be compressed when one circumferential ends of the second spring pressing parts 37, i.e., one contact parts 37a of the second spring pressing parts 37 are contacted to one ends of the second coil springs 65. In other words, only the first coil springs 55 are configured to be compressed until one contact parts 37a of the second spring pressing parts 37 are contacted to one ends of the second coil springs 65 (when the torsion angle is less than a predetermined angle). Then, the second coil springs 65 are configured to start being compressed when the torsion angle becomes greater than or equal to the predetermined angle.

[Action of Torque Converter]

An action of the torque converter 1 will be herein explained. When operating oil is supplied between the inner peripheral parts of the front cover 3 and the piston 8 by a hydraulic actuation mechanism (not shown in the drawings), the operating oil flows through the space between the front cover 3 and the piston 8 to the outer peripheral side. The operating oil flows to the further outer peripheral side via the gap between the front cover 3 and the friction facing 16, and flows into the body of the torque converter 1. Under the condition, the piston mechanism has been entirely moved to the axially transmission side, and clutch engagement at the friction coupling part 15 has been released.

Subsequently, when the operating oil is discharged from the space between the front cover 3 and the piston 8 by the hydraulic actuation mechanism (not shown in the drawings), the piston mechanism is entirely moved to the axially engine side. Accordingly, the friction facing 16 is strongly pressed onto the front cover 3, and clutch engagement is produced. A torque from the front cover 3 is transmitted to the damper mechanism 13 through the piston 8. In the damper mechanism 13, the torque is transmitted from the drive plate 9 to the driven plates 10 through the torsion springs 12. Then, the torque is outputted from the driven plates 10 to the shaft (not shown in the drawings) through the turbine hub 11. When variation in torque is inputted from the engine side in the clutch engagement state, the torsion springs 12 are rotation-directionally compressed between the drive plate 9 and the driven plates 10 in the damper mechanism 13.

[Action of Lock-Up Device]

Figure 4:
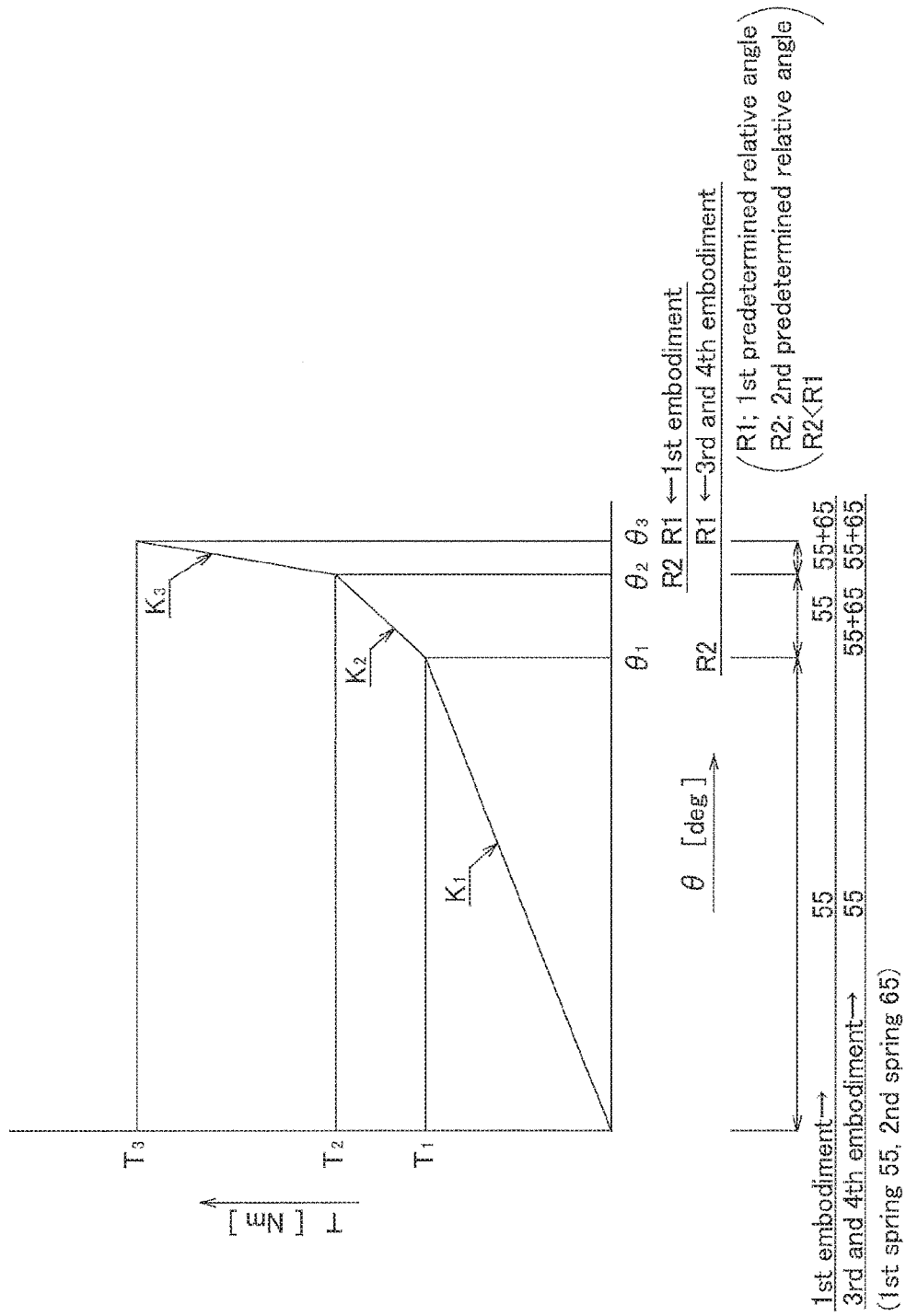
FIG. 4 is a diagram showing torsional characteristics of the lock-up device employed for the first exemplary embodiment.

An action of the lock-up device 6 will be herein explained. When the drive plate 9 and the driven plates 10 start being rotated relatively to each other (when the drive plate 9 is rotated in the R1 direction), the three pairs of the first coil springs 55 (the six first coil springs 55) are firstly compressed between the drive plate 9 (the first spring pressing parts 26) and the driven plates 10 (the contact parts 36a of the second spring holding parts 36) (see P1 in FIG. 2). Accordingly, as shown in FIG. 4, a first stage torsional stiffness K1 is formed.

Next, when the torsion angle becomes a predetermined first angle $\theta 1$, either of two first coil springs 55 in each pair is compressed such that the coiled parts thereof are closely contacted to each other. When the torsion angle then becomes greater than or equal to the predetermined first angle $\theta 1$, only one of the first coil springs 55 in each pair is compressed. Accordingly, a second stage torsional stiffness K2 is formed.

Subsequently, when the torsion angle becomes a predetermined second angle $\theta 2$, one contact parts 37a of the second spring pressing parts 37 of the driven plates 10 are contacted to one ends of the second coil springs 65 (see P2 in FIG. 2). When the torsion angle then becomes greater than or equal to the predetermined second angle $\theta 2$, one of the first coil springs 55 in each pair (three first coil springs 55) and the three second coil springs 65 are compressed. Accordingly, a third stage torsional stiffness K3 is formed.

Finally, when one rivet 49 is contacted to one of the both circumferential ends in each attachment part 28 (each elongated hole) of the drive plate 9 (see P3 in FIG. 2), the stopper mechanism is activated and the maximum torque in the torsional characteristics is determined. As described above, three-stage torsional characteristics are set in the present lock-up device 6. Additionally, an action similar to that described above will be performed also when the drive plate 9 is rotated in the R2 direction.

It should be noted that in the torsional characteristics herein explained, the first stage torsional stiffness K1 is defined by the absolute value of a first torque T1 to that of the first angle θ1. The second stage torsional stiffness K2 is defined by the absolute value of a differential between a second torque T2 and the first torque T1 to that of a differential between the second angle θ2 and the first angle θ1. The third stage torsional stiffness K3 is defined by the absolute value of a differential between a third torque T3 and the second torque T2 to that of a differential between a third angle θ3 and the second angle θ2.

[Features]

(A1) In the present lock-up device 6, the plural first coil springs 55, disposed in radially inner positions, are compressed between the drive plate 9 and the driven plates 10. Additionally, the float member 50 couples the plural first coil springs 55 from the radially inner side of the first coil springs 55. With the construction, a centrifugal force acting on the first coil springs 55 becomes small, and a slide resistance of the first coil springs 55 against the float member 50, which is caused by the centrifugal force, can be remarkably reduced. Put differently, a hysteresis torque can be remarkably reduced. Accordingly, the first coil springs 55 can be efficiently actuated.

Moreover, in the present lock-up device 6, adjacent first coil springs 55 are coupled in series through the float member 50. With the construction, the magnitude of a first stage torsional characteristic (torsional stiffness K1) can be set to be low. Furthermore, even if the first stage torsional characteristic (torsional stiffness K1) is thus set to be low, the second coil springs 65 are configured to be compressed when the torsion angle becomes the predetermined angle θ2 or greater. Hence, the lock-up device 6 can be reliably actuated until a target torque is obtained.

Thus in the present lock-up device 6, multistage torsional characteristics can be set, and also, a hysteresis torque can be reduced.

(A2) In the present lock-up device 6, the torsional stiffness is configured to be changed (from K1 to K2) by compressing at least any one of the plural first coil springs 55 such that the coiled parts thereof are closely contacted to each other in the condition that the plural first coil springs 55 are being actuated. Additionally, when the torsion angle becomes the predetermined angle θ2 (relative angle) or greater, the second coil springs 65 are configured to be compressed, whereby the torsional stiffness is configured to be further changed (from K2 to K3). Thus, multistage torsional characteristics can be easily set in the present lock-up device 6.

(A3) In the present lock-up device 6, the second coil springs 65 are disposed radially outward of the first coil springs 55. The second coil springs 65 are configured to be compressed when the torsion angle becomes the predetermined angle θ2 or greater, and hence, does not contribute to a hysteresis torque in the first stage torsional characteristic (torsional stiffness K1). Put differently, multistage torsional characteristics can be set while a condition is maintained in which the hysteresis torque in the first stage torsional characteristic is reduced.

Second Exemplary Embodiment

Figure 5:
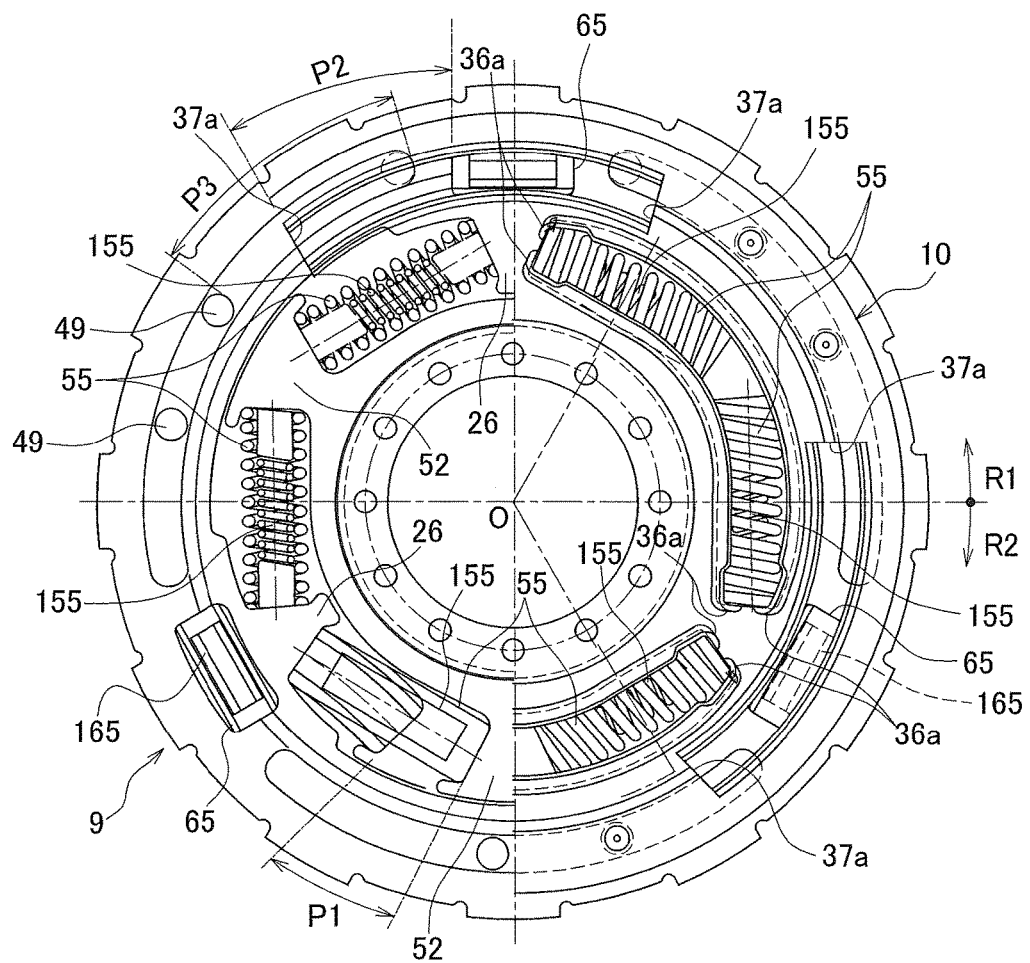
FIG. 5 is a lateral face view of a lock-up device of the torque converter employed for a second exemplary embodiment.
Figure 6:
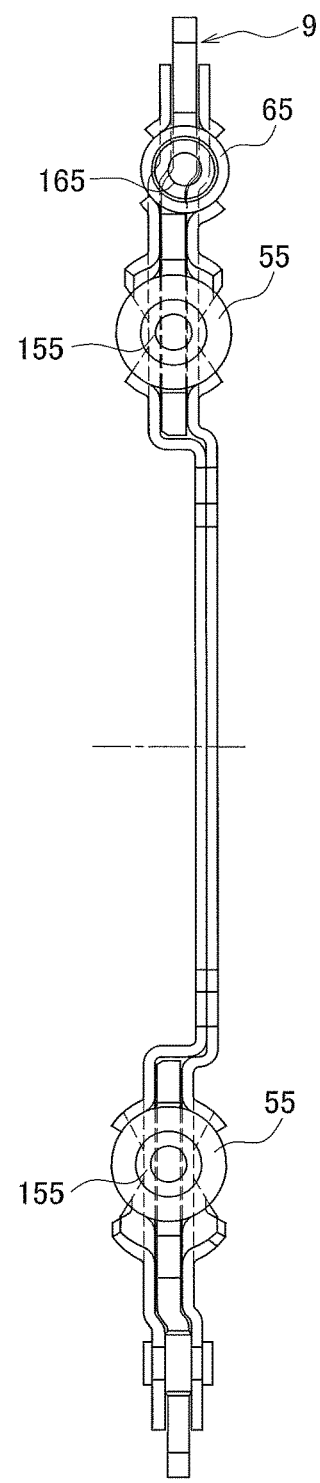
FIG. 6 is a vertical cross-sectional view of a damper of the lock-up device employed for the second exemplary embodiment.

FIGS. 5 and 6 show a lock-up device according to a second exemplary embodiment. Except for the constructions of the torsion springs 12, the constructions of components of the lock-up device in the second exemplary embodiment are similar to those of their corresponding components of the lock-up device in the first exemplary embodiment. Therefore, components similar to their corresponding components in the first exemplary embodiment will not be herein explained. Additionally, in FIGS. 5 and 6, reference signs, assigned to components of the first exemplary embodiment, are similarly assigned to their corresponding components. It should be noted that the construction of the torque converter body of the second exemplary embodiment is also similar to that of the torque converter body in the first exemplary embodiment. Hence, the torque converter body will not be also explained herein.

Components different from their corresponding components in the first exemplary embodiment will be hereinafter explained. In short, explanation of components not herein explained conforms to that of their corresponding components in the first exemplary embodiment.

[Construction of Lock-Up Device]

As shown in FIGS. 5 and 6, the torsion springs 12 include the plural (e.g., six) first coil springs 55, the plural (e.g., three) second coil springs 65, a plurality of (e.g., six) first sub coil springs 155 (exemplary third coil springs) and a plurality of (e.g., three) second sub coil springs 165 (exemplary fifth coil springs).

The basic constructions of the plural first coil springs 55 and the plural second coil springs 65 are similar to those in the first exemplary embodiment. Put differently, the first coil springs 55 and the second coil springs 65 are disposed between the drive plate 9 and the driven plates 10, and function as elastic members. Therefore, the plural first coil springs 55 and the plural second coil springs 65 will not be explained in detail. It should be noted that in an example herein described, the first coil springs 55 are not configured to be compressed such that the coiled parts thereof are closely contacted to each other.

The plural first sub coil springs 155 are respectively disposed in the inner peripheral parts of the first coil springs 55. The plural first sub coil springs 155 respectively have a free length shorter than that of the first coil springs 55. The plural second sub coil springs 165 are respectively disposed in the inner peripheral parts of the second coil springs 65. The plural second sub coil springs 165 respectively have a free length shorter than that of the second coil springs 65.

[Action of Lock-Up Device]

Figure 7:
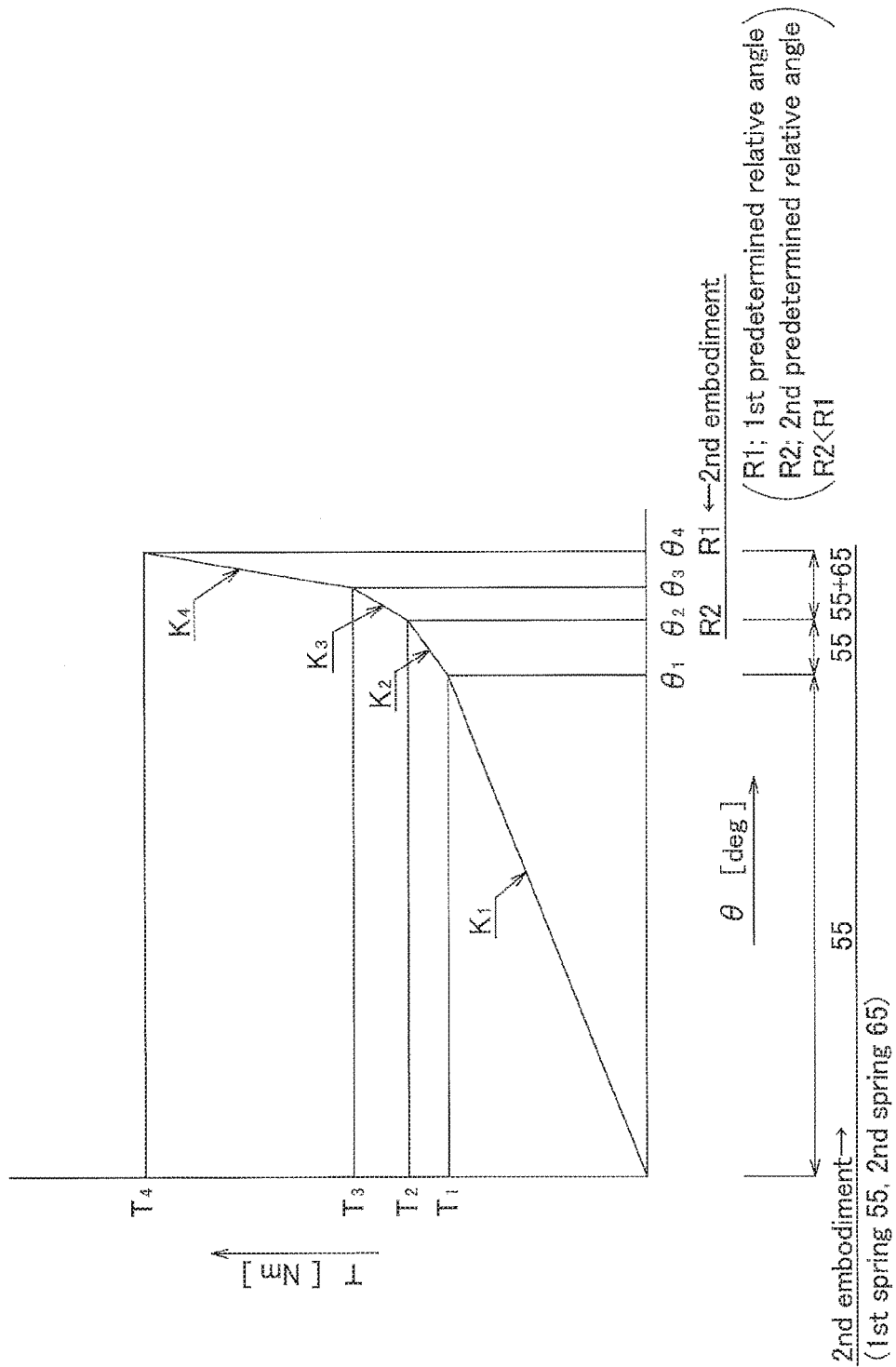
FIG. 7 is a diagram showing torsional characteristics of the lock-up device employed for the second exemplary embodiment.

An action of the lock-up device 6 will be herein explained. When the drive plate 9 and the driven plates 10 start being rotated relatively to each other (when the drive plate 9 is rotated in the R1 direction), the three pairs of the first coil springs 55 (the six first coil springs 55) are firstly compressed between the drive plate 9 (the first spring pressing parts 26) and the driven plates 10 (the contact parts 36a of the second spring holding parts 36). Accordingly, as shown in FIG. 7, a first stage torsional stiffness K1 is formed.

Next, when the torsion angle becomes a predetermined first angle θ1, the drive plate 9 (the first spring pressing parts 26) and the driven plates 10 (the contact parts 36a of the second spring holding parts 36) are contacted to the first sub coil springs 155 (see P1 in FIG. 5). Then, when the torsion angle becomes greater than or equal to the predetermined first angle θ1, the first coil springs 55 and the first sub coil springs 155 in the respective pairs are compressed. Accordingly, a second stage torsional stiffness K2 is formed.

Subsequently, when the torsion angle becomes a predetermined second angle θ2, one contact parts 37a of the second spring pressing parts 37 of the driven plates 10 are contacted to one ends of the second coil springs 65 (see P2 in FIG. 5). Then, when the torsion angle becomes the predetermined second angle θ2 or greater, the first coil springs 55 and the first sub coil springs 155 in the respective pairs and the three second coil springs 65 are compressed. Accordingly, a third stage torsional stiffness K3 is formed.

Subsequently, when the torsion angle becomes a predetermined third angle θ3, one contact parts 37a of the second spring pressing parts 37 of the driven plates 10 are contacted to one ends of the second sub coil springs 165. Then, when the torsion angle becomes the predetermined third angle θ3 or greater, the first coil springs 55 and the first sub coil springs 155 in the respective pairs, the three second coil springs 65 and the three second sub coil springs 165 are compressed. Accordingly, a fourth stage torsional stiffness K4 is formed.

Finally, when one rivet 49 is contacted to one of the both circumferential ends in each attachment part 28 (each elongated hole) of the drive plate 9 (see P3 in FIG. 5), the stopper mechanism is activated and the maximum torque in the torsional characteristics is determined. Thus, four-stage torsional characteristics are set in the present lock-up device 6. Additionally, an action similar to that described above will be performed also when the drive plate 9 is rotated in the R2 direction.

It should be noted that in the torsional characteristics herein explained, the fourth stage torsional stiffness K4 is defined by the absolute value of a differential between a fourth torque T4 (the maximum torque) and the third torque T3 to that of a differential between a fourth angle θ4 and the third angle θ3.

[Features]

(B1) In the present lock-up device 6, advantageous effects similar to those achieved by the aforementioned first exemplary embodiment can be obtained except for advantageous effects regarding close contact of the coiled parts of springs.

(B2) In the present lock-up device 6, the first sub coil springs 155 are disposed in the inner peripheral parts of the first coil springs 55. Hence, the torsional stiffness can be easily regulated by the first sub coil springs 155.

(B3) In the present lock-up device 6, the torsional stiffness is configured to be changed (from K1 to K2) when at least one first sub coil spring 155 disposed in the inner peripheral part of at least any one of the plural first coil springs 55 is further actuated in the condition that only the plural first coil springs 55 are being actuated. Moreover, when the torsion angle becomes the predetermined angle θ2 or greater, the second coil springs 65 are configured to be compressed, whereby the torsional stiffness is configured to be further changed (from K2 to K3). Thus, multistage torsional characteristics can be easily set in the present lock-up device 6. Additionally, in this case, the number of stages in the torsional characteristics can be increased. Hence, the lock-up device 6 is enabled to smoothly perform an action when the torsional stiffness varies at a bent point in the torsional characteristics.

(B4) In the present lock-up device 6, the second sub coil springs 165 are disposed in the inner peripheral parts of the second coil springs 65. Hence, the torsional stiffness can be easily regulated by the second sub coil springs 165. Additionally, the free length of each second sub coil spring 165 is set to be shorter than that of each second coil spring 65. Hence, multistage torsional characteristics can be easily set. Moreover, in this case, the number of stages in the torsional characteristics can be increased. Hence, the lock-up device 6 is enabled to smoothly perform an action when the torsional stiffness varies at a bent point in the torsional characteristics.

Third Exemplary Embodiment

Figure 8:
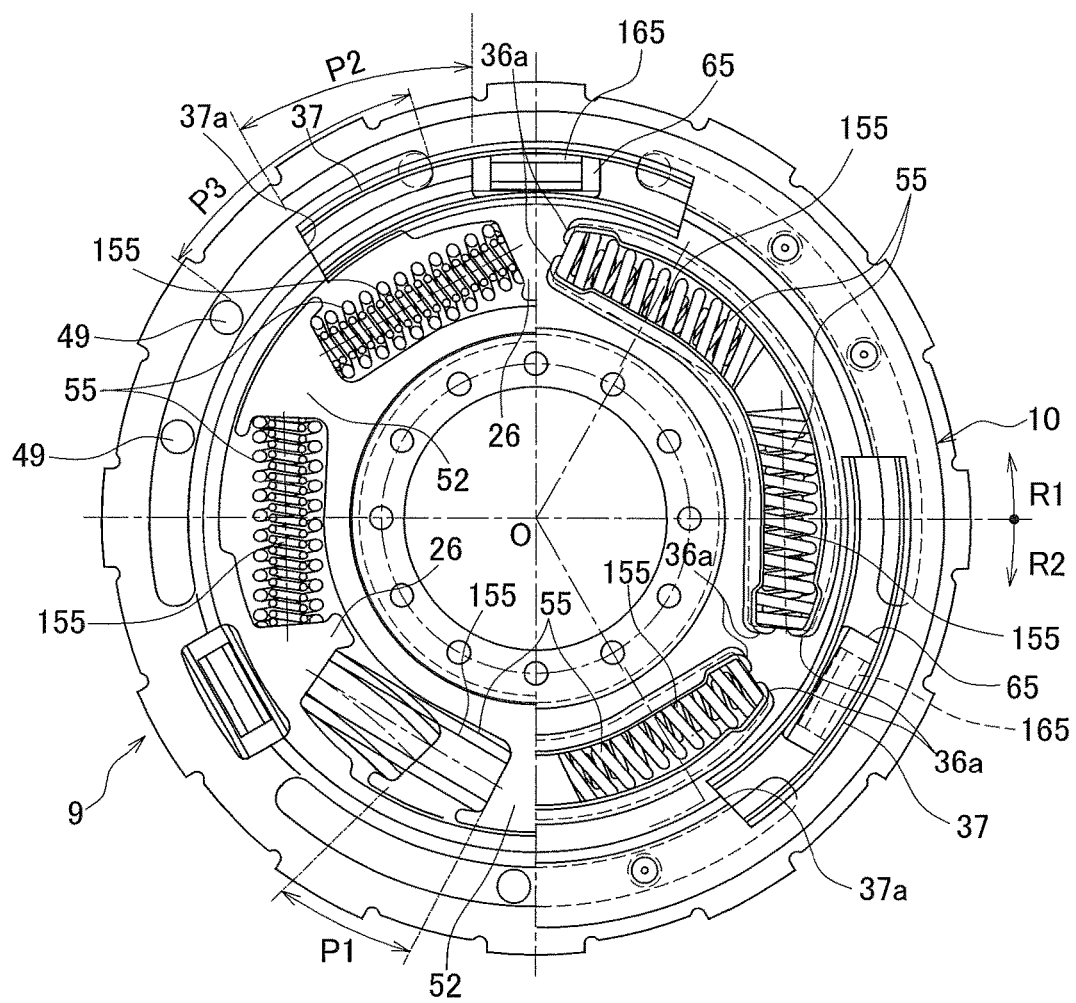
FIG. 8 is a lateral face view of a lock-up device of the torque converter employed for a third exemplary embodiment.
Figure 9:
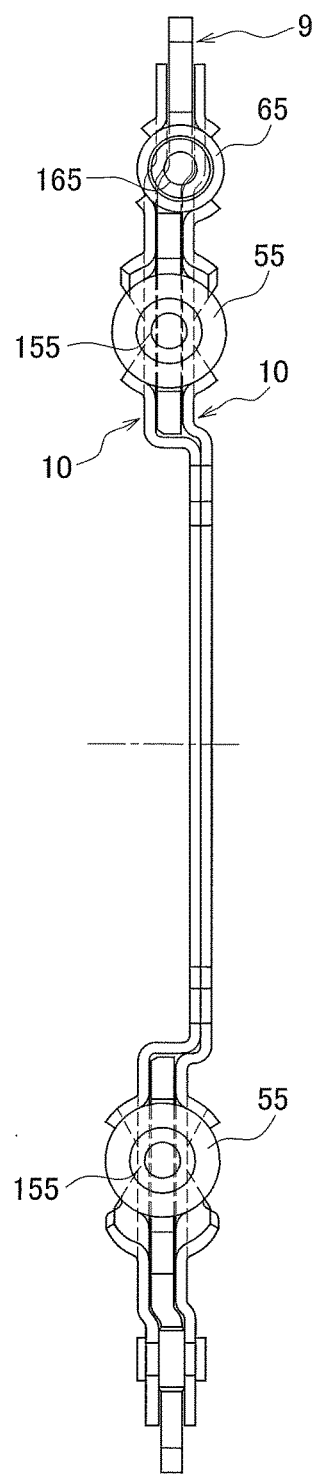
FIG. 9 is a vertical cross-sectional view of a damper of the lock-up device employed for the third exemplary embodiment.

FIGS. 8 and 9 show a lock-up device according to a third exemplary embodiment. Except for the constructions of the torsion springs 12, the constructions of components of the lock-up device in the third exemplary embodiment are similar to those of their corresponding components of the lock-up device in the first exemplary embodiment. Therefore, components similar to their corresponding components in the first exemplary embodiment will not be herein explained. Additionally, in FIGS. 8 and 9, reference signs, assigned to components in the first exemplary embodiment, are similarly assigned to their corresponding components. It should be noted that the construction of the torque converter body in the third exemplary embodiment is also similar to that of the torque converter body in the first exemplary embodiment. Hence, the torque converter body will not be also explained herein.

[Construction of Lock-Up Device]

As shown in FIGS. 8 and 9, the torsion springs 12 include the plural (e.g., six) first coil springs 55, the plural (e.g., three) second coil springs 65, the plural (e.g., six) first sub coil springs 155, and the plural (e.g., three) second sub coil springs 165.

The basic constructions of the plural first coil springs 55 and the plural second coil springs 65 are similar to those in the first exemplary embodiment. Put differently, the first coil springs 55 and the second coil springs 65 are disposed between the drive plate 9 and the driven plates 10, and function as elastic members. Therefore, the plural first coil springs 55 and the plural second coil springs 65 will not be explained in detail. It should be noted that in an example herein described, the first coil springs 55 are not configured to be compressed such that the coiled parts thereof are closely contacted to each other.

The plural first sub coil springs 155 are respectively disposed in the inner peripheral parts of the first coil springs 55. The plural first sub coil springs 155 respectively have a free length equal to that of the first coil springs 55. The plural second sub coil springs 165 are respectively disposed in the inner peripheral parts of the second coil springs 65. The plural second sub coil springs 165 respectively have a free length shorter than that of the second coil springs 65.

[Action of Lock-Up Device]

An action of the lock-up device 6 will be herein explained. When the drive plate 9 and the driven plates 10 start being rotated relatively to each other (when the drive plate 9 is rotated in the R1 direction), the three pairs of the first coil springs 55 (the six first coil springs 55) and the six first sub coil springs 155 are firstly compressed between the drive plate 9 (the first spring pressing parts 26) and the driven plates 10 (the contact parts 36a of the second spring holding parts 36) (see P1 in FIG. 8). Accordingly, as shown in FIG. 4, the first stage torsional stiffness K1 is formed. The first stage torsional stiffness K1 is herein greater than that in the first exemplary embodiment.

Next, when the torsion angle becomes the predetermined first angle θ1, one contact parts 37a of the second spring pressing parts 37 of the driven plates 10 are contacted to one ends of the second coil springs 65 (see P2 in FIG. 8). When the torsion angle then becomes the predetermined second angle θ2 or greater, the three pairs of the first coil springs 55 (the six first coil springs 55), the six first sub coil springs 155 and the three second coil springs 65 are compressed. Accordingly, the second stage torsional stiffness K2 is formed.

Subsequently, when the torsion angle becomes the predetermined second angle θ2, one contact parts 37a of the second spring pressing parts 37 of the driven plates 10 are contacted to one ends of the second sub coil springs 165. When the torsion angle then becomes the predetermined third angle θ3 or greater, the three pairs of the first coil springs 55 (the six first coil springs 55), the six first sub coil springs 155, the three second coil springs 65 and the three second sub coil springs 165 are compressed. Accordingly, the third stage torsional stiffness K3 is formed.

Finally, when one rivet 49 is contacted to one of the both circumferential ends in each attachment part 28 (each elongated hole) of the drive plate 9 (see P3 in FIG. 8), the stopper mechanism is activated and the maximum torque in the torsional characteristics is determined. Thus, three-stage torsional characteristics are set in the present lock-up device 6. Additionally, an action similar to that described above will be performed also when the drive plate 9 is rotated in the R2 direction.

[Features]

(C1) In the present lock-up device 6, advantageous effects similar to those achieved by the aforementioned first exemplary embodiment can be obtained except for advantageous effects regarding close contact of the coiled parts of springs.

(C2) In the present lock-up device 6, the first sub coil springs 155 are disposed in the inner peripheral parts of the first coil springs 55. Hence, the torsional stiffness can be easily regulated by the first sub coil springs 155. Additionally, durability can be enhanced by setting the torsional stiffness with the first coil springs 55 and the first sub coil springs 155 in comparison with setting the torsional stiffness only with the first coil springs 55.

(C3) In the present lock-up device 6, the second sub coil springs 165 are disposed in the inner peripheral parts of the second coil springs 65. Hence, the torsional stiffness can be easily regulated by the second sub coil springs 165. Additionally, the free length of each second sub coil spring 165 is set to be shorter than that of each second coil spring 65. Hence, multistage torsional characteristics can be easily set. Moreover, in this case, the number of stages in the torsional characteristics can be increased. Hence, the lock-up device 6 is enabled to smoothly perform an action when the torsional stiffness varies at a bent point in the torsional characteristics.

Fourth Exemplary Embodiment

Figure 10:
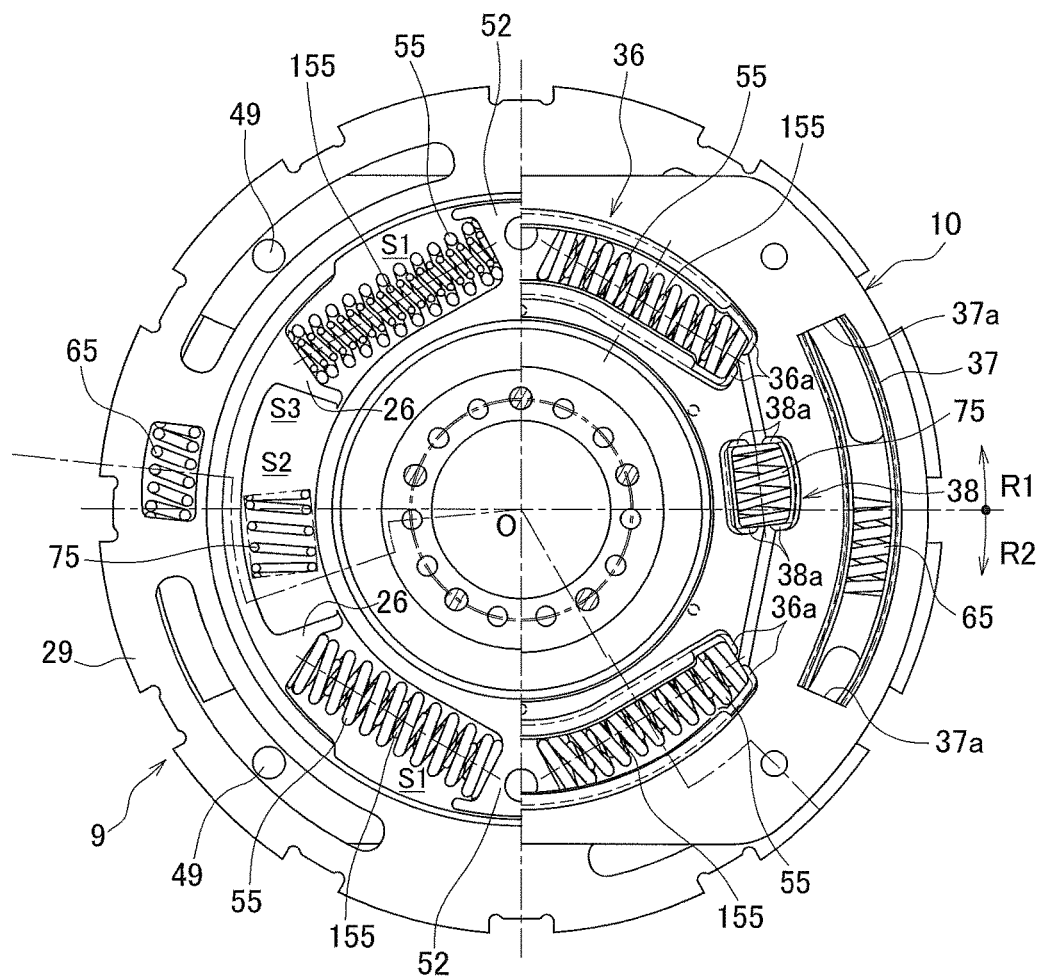
FIG. 10 is a lateral face view of a lock-up device of the torque converter employed for a fourth exemplary embodiment.
Figure 11:
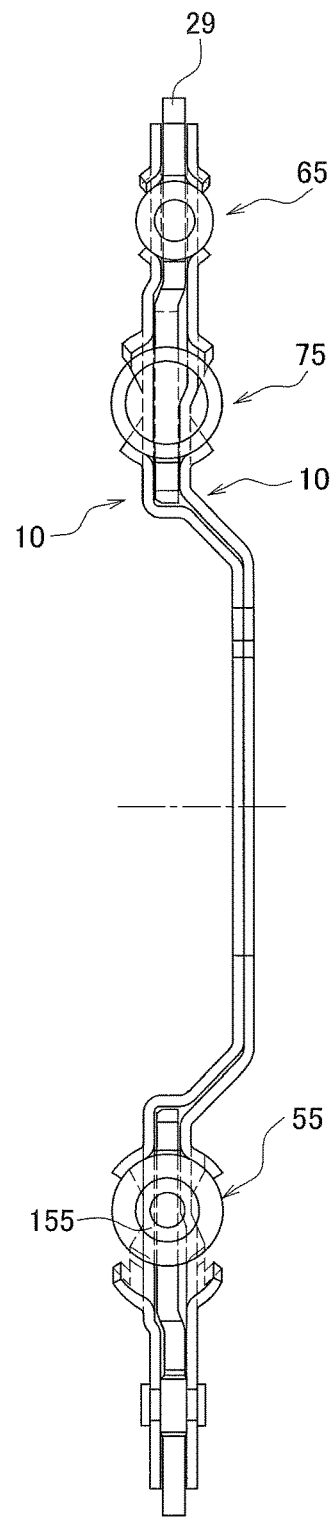
FIG. 11 is a vertical cross-sectional view of a damper of the lock-up device employed for the fourth exemplary embodiment.

FIGS. 10 and 11 show a lock-up device according to a fourth exemplary embodiment. Except for the constructions of the drive plate 9, the driven plates 10, the float member 50 and the torsion springs 12, the constructions of components of the lock-up device in the fourth exemplary embodiment are similar to those of their corresponding components of the lock-up device in the first exemplary embodiment. Therefore, components similar to their corresponding components in the first exemplary embodiment will not be herein explained. Additionally, in FIGS. 10 and 11, reference signs, assigned to components in the first exemplary embodiment, are similarly assigned to their corresponding components. It should be noted that the construction of the torque converter body in the fourth exemplary embodiment is also similar to that of the torque converter body in the first exemplary embodiment. Hence, the torque converter body will not be also explained herein.

[Construction of Lock-Up Device]

As shown in FIGS. 10 and 11, the torsion springs 12 further include the plural (e.g., four) first coil springs 55, the plural (e.g., two) second coil springs 65, the plural (e.g., four) first sub coil springs 155, and plural (e.g., two) third coil springs 75 (exemplary fourth coil springs).

The basic constructions of the plural first coil springs 55 and the plural second coil springs 65 are similar to those in the first exemplary embodiment. Put differently, the first coil springs 55 and the second coil springs 65 are disposed between the drive plate 9 and the driven plates 10, and function as elastic members. Therefore, the plural first coil springs 55 and the plural second coil springs 65 will not be explained in detail. It should be noted that in an example herein described, the first coil springs 55 are not configured to be compressed such that the coiled parts thereof are closely contacted to each other.

The plural first sub coil springs 155 are respectively disposed in the inner peripheral parts of the first coil springs 55. The plural first sub coil springs 155 respectively have a free length equal to that of the first coil springs 55. The third coil springs 75 are disposed in radially inner positions. Additionally, each third coil spring 75 is disposed between one pair of the first coil springs 55 disposed circumferentially adjacent to each other. Moreover, the two third coil springs 75 are disposed radially in opposition to each other.

In the drive plate 9, four spaces (first spaces S1 and second spaces S2) are formed circumferentially among the plural (e.g., four) first spring pressing parts 26. Each pair of the first coil springs 55 is disposed in each of the two first spaces S1 radially opposed to each other. On the other hand, each third coil spring 75 is disposed in each of the two second spaces S2 radially opposed to each other. Each third coil spring 75 is circumferentially movable in each second space S2. Specifically, the circumferential length of each second space S2 is longer than the free length of each third coil spring 75.

Each driven plate 10 further has third spring holding parts 38. The third spring holding parts 38 are formed in radially inner part of the body 35. Additionally, each third spring holding part 38 is formed between the second spring holding parts 36 disposed circumferentially adjacent to each other. The third spring holding parts 38 are window parts. The third spring holding parts 38 hold the third coil springs 75. Moreover, each third spring holding part 38 has contact parts 38a on the both circumferential ends thereof, and the contact parts 38a are contacted to the ends of each third coil spring 75. The plural (two) third spring holding parts 38 are herein formed in the body 35.

The plural (e.g., two) coupling parts 52 are formed in the float member 50. Two third spaces S3 are formed between the two coupling parts 52 disposed circumferentially adjacent to each other. Two of the first spring pressing parts 26 are disposed in each third space S3. Additionally, two of the first coil springs 55 and each third coil spring 75 are disposed in each third space S3. In each third space S3, each third coil spring 75 is disposed circumferentially between adjacent two of the first coil springs 55.

[Action of Lock-Up Device]

An action of the lock-up device 6 will be herein explained. When the drive plate 9 and the driven plates 10 start being rotated relatively to each other (when the drive plate 9 is rotated in the R1 direction), the two pairs of the first coil springs 55 (the four first coil springs 55) and the four first sub coil springs 155 are firstly compressed between the drive plate 9 (the first spring pressing parts 26) and the driven plates 10 (the contact parts 36a of the second spring holding parts 36). Accordingly, as shown in FIG. 4, the first stage torsional stiffness K1 is formed. The first stage torsional stiffness K1 is herein greater than that in the first exemplary embodiment.

Next, when the torsion angle becomes the predetermined first angle θ1, one contact parts 37*a* of the second spring pressing parts 37 of the driven plates 10 are contacted to one ends of the second coil springs 65. When the torsion angle then becomes the predetermined first angle θ1 or greater, the two pairs of the first coil springs 55 (the four first coil springs 55), the four first sub coil springs 155 and the two second coil springs 65 are compressed. Accordingly, the second stage torsional stiffness K2 is formed.

Subsequently, when the torsion angle becomes the predetermined second angle θ2, the drive plate 9 (the first spring pressing parts 26) are also contacted to the third coil springs 75. When the torsion angle then becomes the predetermined second angle θ2 or greater, the third coil springs 75 are compressed between the drive plate 9 (the first spring pressing parts 26) and the driven plates 10 (the contact parts of the third spring holding parts 38). Accordingly, the third stage torsional stiffness K3 is formed.

Finally, when each rivet 49 is contacted to one of the both circumferential ends in each attachment part 28 (each elongated hole) of the drive plate 9, the stopper mechanism is activated and the maximum torque in the torsional characteristics is determined. Thus, three-stage torsional characteristics are set in the present lock-up device 6. Additionally, an action similar to that described above will be performed also when the drive plate 9 is rotated oppositely to the R1 direction.

[Features]

(D1) In the present lock-up device 6, advantageous effects similar to those achieved by the aforementioned first exemplary embodiment can be obtained except for advantageous effects regarding close contact of the coiled parts of springs.

(D2) In the present lock-up device 6, after the plural first coil springs 55 and the plural second coil springs 65 are compressed, the third coil springs 75 are further configured to be compressed. Hence, the number of stages in the torsional characteristics can be increased. Put differently, the lock-up device 6 is enabled to smoothly perform an action when the torsional stiffness varies at a bent point in the torsional characteristics.

(D3) In the present lock-up device 6, the first sub coil springs 155 are disposed in the inner peripheral parts of the first coil springs 55. Hence, the torsional stiffness can be easily regulated by the first sub coil springs 155. Additionally, durability can be enhanced by setting the torsional stiffness with the first coil springs 55 and the first sub coil springs 155 in comparison with setting the torsional stiffness only with the first coil springs 55.

Other Exemplary Embodiments (a) The aforementioned third exemplary embodiment has exemplified the construction that the first sub coil springs 155 (exemplary third coil springs) are respectively disposed in the inner peripheral parts of the first coil springs 55, and each has a free length equal to that of each first coil spring 55. In the construction, either of two first sub coil springs 155 in each pair may be configured to be compressed such that the coiled parts thereof are closely contacted to each other.

Specifically, when the drive plate 9 and the driven plates 10 start being rotated relatively to each other, firstly, three pairs of the first coil springs 55 (the six first coil springs 55) and the six first sub coil springs 155 are compressed between the drive plate 9 (the first spring pressing parts 26) and the driven plates 10 (the contact parts 36*a* of the second spring holding parts 36) (see P1 in FIG. 8). Accordingly, as shown in FIG. 7, the first stage torsional stiffness K1 is formed.

Next, when the torsion angle becomes the predetermined first angle θ1, the first sub coil spring 155 disposed in the inner peripheral part of either of two first coil springs 55 (hereinafter referred to as one first coil spring 55) in each pair is compressed such that the coiled parts thereof are closely contacted to each other. Put differently, one first coil springs 55 and the first sub coil springs 155 compressed with the coiled parts thereof being closely contacted to each other become inactive. Then, the other of two first coil springs 55 (hereinafter referred to as the other first coil spring 55) in each pair and the first sub coil spring 155 disposed in the inner peripheral part of the other first coil spring 55 in each pair (the first sub coil spring 155 not compressed such that the coiled parts thereof are closely contacted to each other) are compressed. Accordingly, as shown in FIG. 7, the second stage torsional stiffness K2 is formed.

Subsequently, when the torsion angle becomes the predetermined third angle θ3, one contact parts 37*a* of the second spring pressing parts 37 of the driven plates 10 are contacted to one ends of the second sub coil springs 165. When the torsion angle then becomes the predetermined third angle θ3 or greater, either first coil springs 55 in the respective pairs (the three first coil springs 55), the first sub coil springs 155 not compressed such that the coiled parts thereof are closely contacted to each other (the three first sub coil springs 155), the three second coil springs 65, and the three second sub coil springs 165 are compressed. Accordingly, the fourth stage torsional stiffness K4 is formed.

Finally, when one rivet 49 is contacted to one of the both circumferential ends in each attachment part 28 (each elongated hole) of the drive plate 9 (see P3 in FIG. 8), the stopper mechanism is activated and the maximum torque in the torsional characteristics is determined. Thus, four-stage torsional characteristics are set in the present lock-up device.

As described above, the number of stages in the torsional characteristics can be increased by compressing either of two first sub coil springs 155 in each pair such that the coiled parts thereof are closely contacted to each other.

Now in general, the strength of a coil spring for which no thermal treatment has been performed is lower than that of a coil spring for which thermal treatment has been performed. Additionally, in order to prevent brittle breaking, no thermal treatment has been performed for a coil spring to be compressed such that the coiled parts thereof are closely contacted to each other.

For example, the aforementioned first coil springs 55 are main coil springs, and hence, it is important to reliably achieve strength required for the first coil springs 55. Therefore, it is desirable to perform thermal treatment for the first coil springs 55. Due to the above, not the first coil springs 55 but the first sub coil springs 155 are designed as coil springs for which no thermal treatment is performed (coil springs to be compressed such that the coiled parts thereof are closely contacted to each other). With the design, required strength is reliably achieved for the main first coil springs 55, and simultaneously, the number of stages in the torsional characteristics can be increased by the auxiliary first sub coil springs 155. Put differently, enhancement in strength of the lock-up device and increase in number of stages of the torsional characteristics can be simultaneously achieved.

(b) The aforementioned third and fourth exemplary embodiments have exemplified the construction that the first coil springs 55 are not configured to be compressed such that the coiled parts thereof are closely contacted to each other. However, the first coil springs 55 may be configured to be compressed such that the coiled parts thereof are closely contacted to each other. Alternatively, instead of compressing the first coil springs 55 such that the coiled parts thereof are closely contacted to each other, the first sub coil springs 155 disposed in the inner peripheral parts of the first coil springs 55 may be configured to be compressed such that the coiled parts thereof are closely contacted to each other. With the configuration, a larger number of stages can be set in the torsional characteristics. Additionally, advantageous effects similar to those achieved in the aforementioned exemplary embodiments can be also simultaneously obtained.

(c) The aforementioned third and fourth exemplary embodiments have exemplified the construction that the first sub coil springs 155 disposed in the inner peripheral parts of the first coil springs 55 respectively have a free length equal to that of the first coil springs 55. However, the first sub coil springs 155 may be respectively constructed so as to have a free length shorter than that of the first coil springs 55. With the construction, a larger number of stages can be set in the torsional characteristics. Additionally, advantageous effects similar to those achieved in the aforementioned exemplary embodiments can be also simultaneously obtained.

(d) The fourth exemplary embodiment has exemplified the construction that the second sub coil springs 165 are not disposed in the inner peripheral parts of the second coil springs 65. However, the second sub coil springs 165 may be respectively disposed in the inner peripheral parts of the second coil springs 65. In the construction, the third coil springs are configured to be activated after the second sub coil springs 165 are activated. With the construction, a larger number of stages can be set in the torsional characteristics. Additionally, advantageous effects similar to those achieved in the aforementioned exemplary embodiment can be also simultaneously achieved.

INDUSTRIAL APPLICABILITY

The present invention is widely applicable to lock-up devices.

REFERENCE SIGNS LIST

1 Torque converter
3 Front cover
6 Lock-up device
9 Drive plate (Input rotary member)
10 Driven plate (Output rotary member)
12 Torsion spring
55 First coil spring
65 Second coil spring
75 Third coil spring (Exemplary fourth coil spring)
155 First sub coil spring (Exemplary third coil spring)
165 Second sub coil spring (Exemplary fifth coil spring)

The invention claimed is:

1. A lock-up device for a torque converter for transmitting a torque and for absorbing and attenuating a torsional vibration, comprising:
an input rotary member;
an output rotary member disposed on both axial sides of the input rotary member and rotatable relatively to the input rotary member;
a plurality of first coil springs disposed in radially inner positions, at least any one of the plurality of first coil springs configured to be compressed in series by rotation of the input rotary member relative to the output rotary member whereby the torque is configured to be inputted therein from the input rotary member, when the input rotary member and the output rotary member are rotated relatively to each other at a first predetermined relative angle or less;
at least one second coil spring disposed radially outward of the first coil springs and configured to be compressed with only the at least any one of the plurality of first coil springs when the input rotary member and the output rotary member are rotated relatively to each other at a second predetermined relative angle or greater, the second predetermined relative angle being smaller than the first predetermined relative angle; and
a float member disposed radially inward of the plurality of first coil springs and coupling the plurality of first coil springs in series.

2. The lock-up device recited in claim 1, wherein a torsional stiffness in torsional characteristics is configured to be changed by compressing the at least any one of the plural first coil springs such that coiled parts thereof are contacted to each other,
the at least one second coil spring is configured to be compressed with only the at least any one of the plurality of first coil springs when the input rotary member and the output rotary member are rotated relatively to each other at the second predetermined relative angle or greater whereby the torsional stiffness is configured to be further changed.

3. The lock-up device recited in claim 1, further comprising:
a plurality of third coil springs, each disposed in an inner peripheral part of one of the first coil springs.

4. The lock-up device recited in claim 3, wherein the plurality of third coil springs respectively have a free length shorter than a free length of the first coil springs,
a torsional stiffness in torsional characteristics is configured to be changed when at least any one of the plural first coil springs and the respective of the third coil springs disposed in the inner peripheral part of the at least any one of the plural first coil springs are simultaneously compressed,
the at least one second coil spring is configured to be compressed with only the at least any one of the plurality of first coil springs and third coil spring when the input rotary member and the output rotary member are rotated relatively to each other at the second predetermined relative angle or greater whereby the torsional stiffness is configured to be further changed.

5. The lock-up device recited in claim 3, wherein a torsional stiffness in the torsional characteristics is configured to be changed when the first coil springs and the third coil springs are simultaneously compressed,
the torsional stiffness is configured to be further changed when at least any one of the plural third coil springs is compressed such that coiled parts thereof are contacted to each other, and
the at least one second coil spring is configured to be compressed with only the at least any one of the plurality of first coil springs and third coil spring when the input rotary member and the output rotary member are rotated relatively to each other at the second predetermined relative angle or greater whereby the torsional stiffness is configured to be further changed.

6. The lock-up device recited in claim 1, further comprising:
- at least one fourth coil spring disposed circumferentially away from the plurality of first coil springs at intervals, wherein
- the at least one fourth coil spring is configured to be further compressed after the plurality of first coil springs and the at least one second coil spring are compressed whereby the torsional stiffness is configured to be further changed.

7. The lock-up device recited in claim 1, further comprising:
- at least one fifth coil spring disposed in an inner peripheral part of the at least one second coil spring.

8. The lock-up device recited in claim 1, wherein the float member has a body, coupling parts and holding parts, the body disposed radially inward of the plurality of first coil springs, the coupling parts having a shape outwardly protruding from the body and each disposed between adjacent two of the first coil springs, the holding parts disposed radially outward of the coupling parts and each holding outer peripheral parts of adjacent two of the plurality of first coil springs.

* * * * *